3,411,552
FLUID DISPENSER FOR AUTOMOTIVE USE
Budd D. Love, 10175 Sunland Blvd.,
Sunland, Calif. 91040
Filed Mar. 21, 1966, Ser. No. 535,899
8 Claims. (Cl. 141—198)

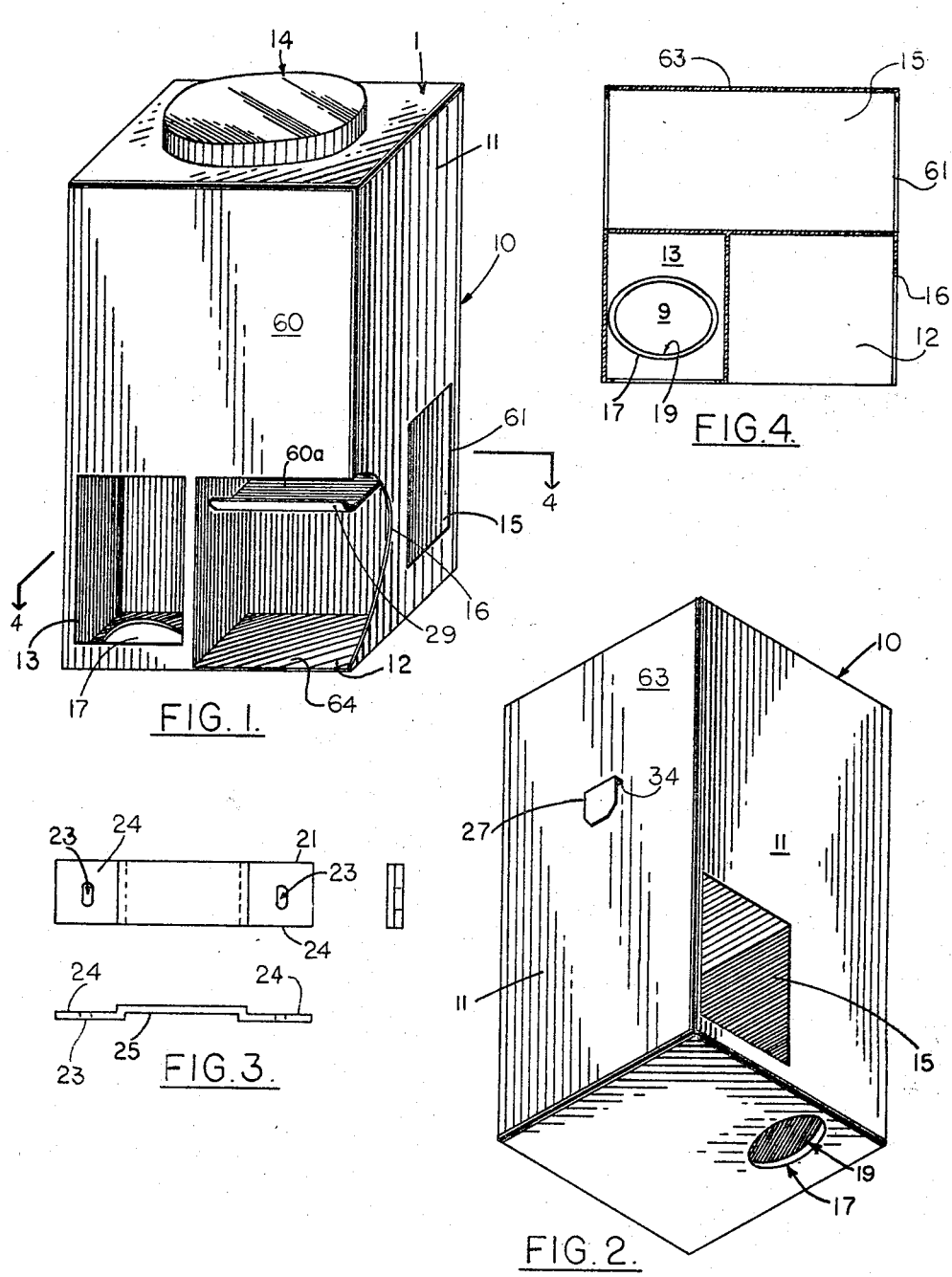

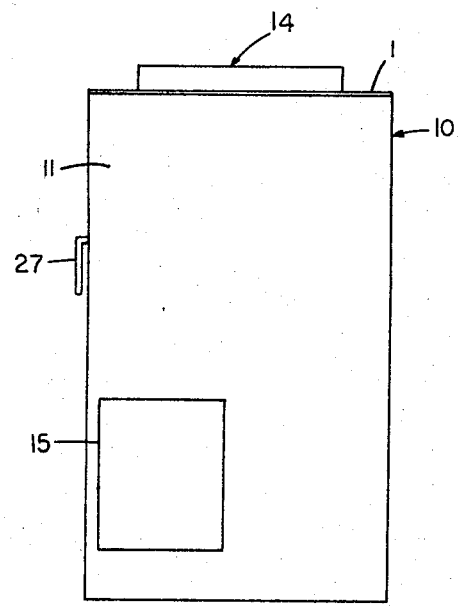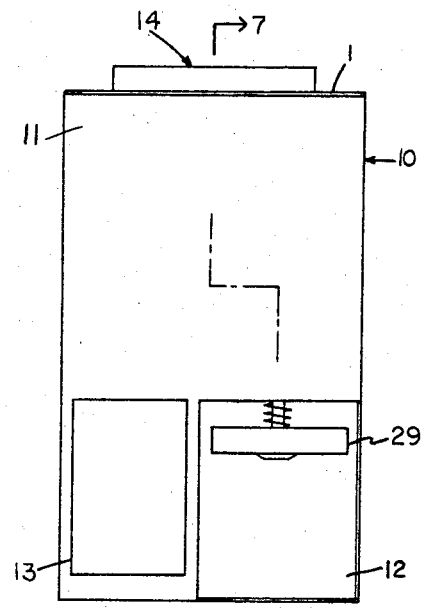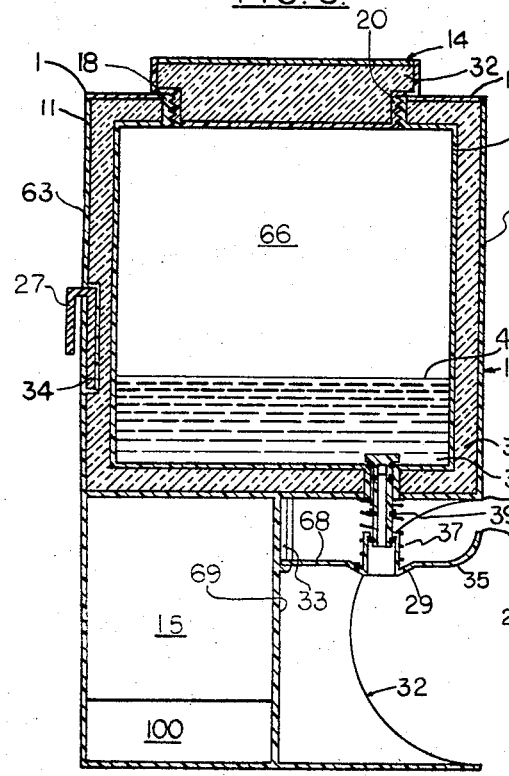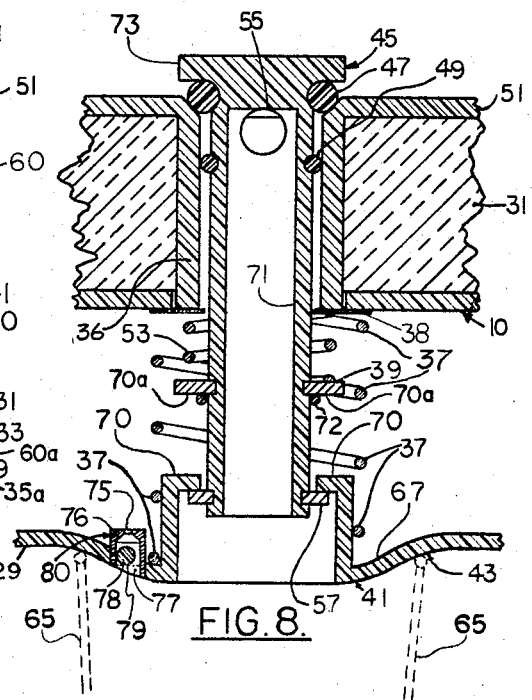

ABSTRACT OF THE DISCLOSURE

A fluid dispenser for use in automobiles is disclosed including an insulated fillable fluid container as one compartment therein, a double acting valve actuated by pressing a cup upward thereagainst providing dispensing means for discharging fluid from said container into said cup and also including storage and discard compartments for fresh and used cups respectively.

---

This invention relates generally to dispensing devices for fluids, and more particularly to a novel and convenient accessory dispenser adaptable for use in automobiles or other vehicles for dispensing liquid beverages in the automotive vehicle so that the driver of the vehicle is not distracted in its use and may in fact use the dispensing facility without taking his eyes off the path of travel of the vehicle.

In prior art devices for dispensing beverages or other fluids in vehicles, none provides for a combination of cup storage and disposal and ease of handling of cups during filling. The prior art means incorporate inconvenient spouts which must be manipulated separately by hand to discharge fluid into cups. These devices do not have apertured refuse receptacle means into which cups may be placed after they have been used. They lack fresh cup storage means. These prior art devices normally make it necessary for the user to position the cup beneath the valve or spout and hold it in place securely while the spout valve handle is manipulated to discharge the liquid into the cup.

The present invention conceives novel dispensing means in which the fluid and cups for the fluid may be stored safely and conveniently in moving vehicles such as automobiles, trucks, airplanes, or boats. The dispenser may be operated by the simple action of placing the cup beneath the spout and pressing lightly upward against a resilient discharge valve normally held closed by the urge of a resilient means therein which is of a new configuration. The new device by its structure makes it possible for a passenger or driver to conveniently obtain a cup from a storage area provided and fill the cup with the fluid beverage without looking away from the path of travel because at no time will there be danger of spillage or a need to use complex, manually operated spigot valves or other mechanical contrivances which require special attention of or handling by the user.

A particular feature of the new beverage dispenser is a double acting resilient discharge valve which is normally urged to close a fluid outlet in the bottom of an insulated storage container for the fluid. The configuration of the dispenser is such that the upper portion thereof comprises the container proper and the lower portion is compartmented to store cups, provide a cup refuse bin, and a convenient filling or discharge compartment with the above-mentioned novel discharge valve therein. The dispenser also includes a mounting clip arrangement for attaching it in a convenient location in the vehicle in which it is to be installed, so that easy removal of the dispenser may be accomplished for filling or other necessary action.

It is accordingly an object of this invention to provide an economical, convenient, and more efficient beverage dispenser for installation in automotive vehicles.

It is another object of the invention to provide a vehicle mounted beverage dispenser with a new, more convenient spout arrangement by which fluid can be discharged into a cup without the need for looking at one's action in operating the spout.

It is an object of the invention to provide in a fluid dispenser a valve which cannot be inadvertently operated before insertion of a cup in the dispenser, or while the cup is being inserted into a filling position.

It is still another object of this invention to provide a valve in a plate which will automatically stop the flow of fluid when the cup is filled.

It is a further object of the invention to provide a novel beverage dispenser for vehicular use in which a cup may be used to actuate a non-spilling outlet discharge valve which will automatically close when the cup has been filled and the cup removed.

It is yet another object of the invention to provide a novel readily transportable fluid container which includes an insulated upper area to contain a fluid and to maintain the temperature of the fluid and which has a compartmented lower area for storage and disposal of cups and for the convenient insertion of a cup to be filled, and including means for operating a discharge valve therein with the cup to be filled.

These and other objects of this invention will be more fully understood from the specification which follows and the accompanying drawings in which a preferred embodiment has been illustrated.

It should be clearly understood that the device shown and described is exemplary and that those skilled in the arts appertaining to this invention will be able to devise other embodiments in the light of the teachings herein within the ambit of the appended claims.

In the drawings:

FIGURE 1 is a perspective view taken from the right front aspect of an embodiment of the invention illustrating the convenience features thereof presented to the operator of a moving vehicle in which it may be installed and used;

FIGURE 2 is a perspective view as observed from the bottom left rear aspect of the article illustrating the mounting means therefor and other novel features such as cup disposal and release from storage apertures, the latter adapted for use in a severe vibration mode of operation of a vehicle;

FIGURE 3 is a side elevational, end elevational and plan view of a mounting bracket for the article shown in FIGURES 1 and 2;

FIGURE 4 is a cross-sectional view through 4—4 of FIGURE 1;

FIGURE 5 is a left side elevational view of the invention article;

FIGURE 6 is a front elevational view of the invention article;

FIGURE 7 is a cross sectional view through 7—7 of the article shown in FIGURE 6; and FIGURE 8 is an enlarged detailed cross-sectional drawing of a cup-pressure actuated fluid discharge valve, a part of the invention.

In the perspective view of the invention shown particularly in FIGURE 1 and in the other figures generally, the encasement 10 of the invention can be seen to include a generally rectangular housing 11 with a centrally located circular closure member 14 on top. As may be seen at 20 in FIGURE 7, closure 14 is threaded externally and there is an internally threaded aperture 18 in the top of housing 11. The threads of aperture 18 and closure 14 at 18 match so that closure 14 may be readily removed and rotatably inserted in housing 11 and screwed therein to seal the fluid in enclosure or chamber 66. Housing 11 forms the upper part of encasement 10 and can be seen in FIGURE 7 to be a double walled-structure with the housing 11 forming an outer wall 60, 63 and the inner wall 51 being separated from outer wall 60, 63 by insulating material 31. A similar insulating material 32 fills circular closure member 14. As would be well known to those skilled in this art, a bleed aperture will be required in closure member 14 so that atmospheric air may replace fluid withdrawn from chamber 66.

The lower portion of housing 11 includes cup storage and dispensing compartment 13 with an elliptical dispensing aperture 9 in the bottom thereof. A larger area 12 to the right of the cup storage compartment 13 encompasses the entire right corner of encasement 10 with the cutaway area 16 at the right side being provided to permit hand access when one holds a cup within the compartment 12 up against the valve pressure plate 29. Towards the rear, behind compartment 12 and 13 there is provided a cup disposal compartment 15 with a rectangular opening 61 thereinto through which to insert discarded cups.

In the rear wall 63 a clip such as 27 (FIGURE 7) is inserted into a slot 34 provided therein for it. Clip 27 is designed to interfit with bracket 21 shown in FIGURE 3. Bracket 21 has a raised central area 25 and mounting feet 24 extending therefrom in which holes 23 are provided for attachment of the bracket 21 with screws at a suitable location to a wall surface such as the fire wall of a vehicle. When so attached clip 27 hangs over bracket 21 providing a secure support for encasement unit 10. Bracket 21 may be attached alternatively to any other appropriate near vertical surface of an automotive vehicle.

FIGURE 4 more clearly illustrates the form of the elliptical cup-dispensing aperture 9 which is tapered in a reducing dimension towards the bottom so that, in order to pull a single cup out of compartment 13, it must be slightly deformed into an elliptical shape. The deformed cup can be easily removed while the remaining cups will be retained by the tapered walls between the outer ellipse 17 and the inner ellipse 19 defining the tapered dispensing aperture 17/19. The deformation of the cups is easily accomplished by the driver of the vehicle exerting pressure on the cup with the thumb and forefinger. This can be done with minimal effort.

It should be particularly noted that an elliptical aperture such as 9 has advantages in a vibrating environment in that the vibrations tend to wedge the cup into the narrowest portion of the ellipse, thereby preventing undesirable loss of cups.

FIGURE 5 shows the left side of the encasement 10 and particularly the location of cup disposal compartment 15 therein.

Cups can be placed in the compartment 15 after use so as to keep the vehicle litter free. Little effort is necessary to use this disposal means since the cups need only be turned to a horizontal position and pushed into the compartment. The dimensions and lips 100 (see FIGURE 7) are such that deformation and friction hold them in the compartment. Lips 100 prevent single cups from falling out of compartment 15.

FIGURE 6 is presented to show that the cup dispensing compartment 13 is in a convenient position for use by the driver of the vehicle. After extracting a cup 65 from the compartment 13, as hereinbefore described, it can be inserted into the beverage dispensing compartment 12 under the valve-actuating pressure plate 29. Valve 45 cannot be actuated by sliding a cup under or lifting the front 35 of the pressure plate 29 because the upper front portion 35a of a plate 29 mating with the bottom of enclosure 10 at point 60a is not sufficient to actuate valve 45. The rear 68 of pressure plate 29 is engaged in slot 33 and must be lifted simultaneously with the front 35 of plate 29 to actuate valve 45. To initiate the flow of beverage an upward force is exerted on the cup 65 to press upon and lift actuator plate 29. At any time during the filling operation, the cup 65 can be dropped without spillage as further explained below by action of valve actuator plate 29 normally pressing downward to hold the cup against the bottom 64 of compartment 12. Actuator plate 29 not only holds the cup against the bottom 64 of the dispensing compartment 12 but also completely covers the top of the cup 65, thus preventing spillage.

FIGURE 7 illustrates in cross-section the internal construction of the invention and more particularly shows the inner tank wall 51 and insulation 31 such as a foam or other insulating material which insulates the inside 66 from the outside 60–63 of container 10. The top 1 of the outside container 10 is removable for inserting the foam insulation 31 between the inner tank wall 51 and the outside walls 60–63, etc. The beverage fluid 41 is shown in the tank 66, which is capped by insulated circular closure member 14. An outlet cylinder 36 is formed in the bottom of the tank 66 such that a valve piston 45 can be positioned movably therein. A retaining ring 39 keeps piston 45 in cylinder 36. A spring biasing means in the form of coil spring 53 is positioned between the bottom washer 38 on the outer end of cylinder 36 and a retaining ring 39 on piston 45. This keeps piston 45 in a normally downward position, sealing off outlet cylinder 36. Spring 37, larger in diameter than spring 53, and actuator plate 29 coact to hold a cup 65 against the bottom 64 of the compartment 12. Spring 37 surrounds spring 53 and rests between the upper surface 67 of plate 29 and the bottom washer 38 of compartment 10. The orientation of actuator plate 29 is maintained by a tongue means 68 integral therewith and slidably engageable with grooves 33 formed in the rear walls 69 of the container compartment 12. Actuator plate 29 is formed as at 41–43 to receive different-sized cups and to cover the entire top of the largest cup used so as to insure against spillage and tipping. The uppermost flange 35a of plate 29 can be lifted until restrained by the lowest portion 60a of wall 60, which is the upper boundary of compartment 12, without releasing any liquid in compartment 12. This safety feature precludes the inadvertent actuation of piston 45 by bumping or cup insertion in compartment 12. No beverage flows until the uppermost surface 70 or plate 29 encounters retaining ring 39 which forms a stopping flange around piston 45, at which time piston 45 is moved upwardly initiating the cup filling operation, dispensing fluid through aperture 55 in the cylinder 71 of piston 45. Surface 70 seals on surface 70a against O-ring 72 to automatically stop the release of fluid when the cup is filled. The slightly downward protrusion in plate 29 also serves to restrict the fluid level from reaching the upper rim of the cup, so that the contents will not be spilled in the operation of removing a cup.

FIGURE 8 details in a larger scale the construction of the valve piston 45/71 and actuator plate 29. Piston 45 is urged downward by the spring 53 acting against washer 38 and the upper surface of retaining ring 39 so that a sealing ring 47 is normally seated under head 73 of piston 45 to close the valve piston 45/71. Sealing ring 49 within outlet cylinder 36 tightly fitted about piston 45 confines the fluid to the area of the apertures 55 in piston cylinder 71 and the head 73 of piston 45. Spring 37 acts between washer 38 and the actuator plate 29, keeping the actuator plate 29 against a lower retaining ring 57 on piston cylinder 71 unless actuated by inserting a cup 65 under plate 29 and urging plate 29 upward to engage and seal lip 70 with retaining ring 39. Further upward pressure forces cylinder 71 upward, permitting fluid to flow under cylinder head 73 into aperture 55 from the tank 66 through the piston cylinder 71 into the cup 65. As a further guarantee that, upon operation of valve 45 during filling of cup 65, cup 65 will not overflow, a ball valve as shown in FIGURE 8 at 80 is provided. Ball valve 80 includes a cylinder 77 sealed in plate 29 as shown in the drawing to the left of spring 37. The cylinder is open to the top of cup 65 through the plate 29 and a screen 79 covers an aperture on the cup side of plate 29. While the top surface of lip 70 and the bottom surface 70a of retaining ring 39 are mating on O-ring 72, air flow normally occurs through aperture 75. Within cylinder 77 of ball valve 80 a small ball 78 is slidably positioned. The top of cylinder 77 is tapered as indicated at 76 so that as fluid in cup 65 nears the top of the cup during filling, and reaches screen 79 at plate 29, the ball 78 will float up, closing aperture 75 to prevent further filling, since there will be no further air release and the flow of fluid into cup 65 from chamber 66 will cease, unable to continue against the back pressure buildup. The complete operation, from extracting a cup to filling the cup, can be accomplished without looking because of the novel features of the invention. It should be noted that no safety hazard to the operation of a moving vehicle has been created in the process of obtaining a drink because it can be done without looking. This is the major purpose and chief utility of the invention.

In particular, what I claim as new is:

1. A beverage dispenser for use in an automotive vehicle, comprising in combination:

a unitary compartmented housing, the compartments thereof including: a thermally insulated container for fluids; a storage and dispensing area for fresh cups beneath and to one side of said container; a waste cup disposal and storage area beneath and behind said container, and a fluid dispersing area beneath said container and adjacent said area for fresh cups, a wall of said area for cups and a wall of said waste cup disposal area forming adjacent side and rear walls of said fluid dispensing area, the opposite side wall thereof being contoured to permit hand-held cup access from the side of said housing into said fluid dispensing area, the frontal area of said fluid dispensing area being open, said side wall, rear wall, and opposite side wall being joined by a base forming a platform for cups;

a spring-loaded normally closed plug valve disposed in the bottom of said container above and extending into said fluid dispensing area so as to permit the discharge of fluid from said container when said valve is actuated against the urge of said spring load;

a cup covering plate being slidably disposed on said valve and being positioned at the remote end thereof adjacent the lower surface of said container, a resilient element being provided to normally urge said plate downwardly;

said cup covering plate being substantially rectangular and having a slotted edge abutting said rear wall of said fluid dispensing area; and an extension spaced from said rear wall of said dispensing area and in engagement with said slotted edge for slidable vertical movement of said plate therein so as to guide said plate vertically in said fluid dispensing area when a cup is pushed thereagainst; and against said resilient element to engage said spring-loaded plug valve and release the fluid from said container into said cup, said plate being urged downwardly against said cup when filled and said cup is resting on said platform, said plate covering said cup against splash, tipping and spillage of the fluid therein until the cup is removed from the dispensing area for consumption of the fluid therein.

2. For the beverage dispenser defined in claim 1 said storage and dispensing area having in the bottom thereof an elliptical aperture to receive cups and hold them for storage, so that in order to obtain a cup from said storage and dispensing area the bottom-most of said cups must be deformed to the shape of the elliptical aperture to permit the removal of a cup from said storage area.

3. In the beverage dispenser defined in claim 1 a ball float valve disposed in said cup covering plate as an air release so as to provide an automatic shut-off means when said cup has been filled and the ball in said ball float valve is floated on the fluid to shut off the fluid flow by closing off said air release by said valve.

4. A beverage dispenser adapted for use in an automotive vehicle, said dispenser comprising:

a thermally insulated fluid container forming one compartment of said dispenser and having a removable cover to permit the filling of said container, side walls containing insulating material and a bottom surface;

a cup storage compartment and dispensing compartment respectively being positioned below said fluid container, a double-acting normally closed plug valve being inserted through said bottom surface of said container into said dispensing compartment to provide a fluid outlet path from said container to said dispensing compartment when said valve is opened;

a contoured plate disposed near the bottom of said plug valve, and being centrally apertured so as to be slidable on said valve;

a retaining ring about said plug valve above said contoured plate;

a first spring disposed about said valve between the top surface of said retaining ring and the bottom of said container through which said valve is extended and normally urging said valve downward to its closed position; and a second spring disposed about said first spring and said retaining ring, and being larger in diameter than said retaining ring, said second spring extending from said bottom of said container compartment to the top of said contoured plate and normally urging said plate downward;

whereby when a cup is placed in said dispensing compartment, beneath said contoured plate under said plug valve, and said plate is urged upward, against the urge of said second spring the plate will butt against said retaining ring to force it upward against the urge of said first spring thereby opening said valve to permit the fluid from said container to pass through said valve into said cup, when said cup is released after filling the downward urge of said second spring forces said contoured plate over said cup, covering it and preventing spilling, the urge of said second spring downward on said plate being such as to keep said cup in said dispensing compartment until one is ready to consume its contents.

5. In the beverage dispenser defined in claim 4, the bottom of said cup storage compartment having an elliptical aperture therein, the minor diametral dimension thereof being slightly smaller than the diameter of the top of cups stored therein so that said cups must be squeezed to conform with said aperture for removal of the cups from the storage compartment.

6. A beverage dispenser for mounting on the fire wall surface within the passenger compartment of an automotive vehicle, said dispenser comprising:

a generally rectangular housing having a mounting clip on the back thereof for securing the housing to the firewall surface;

a thermally insulated fluid containing tank encompassing a substantial upper portion of said housing;

a group of compartments encompassing the lower portion of said housing;

one of said group of compartments being a waste cup disposal compartment disposed at the rear of said housing and having an aperture to one side of said housing for access thereinto to insert waste cups;

another of said group of compartments being a fresh cup storage and dispensing compartment disposed at the lower left of said housing, said dispensing compartment having an elliptical aperture in the bottom thereof from which to dispense cups removably stored therein; and the third of said group of compartments being disposed in the right front area of said housing and having extending thereinto a spring-loaded normally-closed piston valve slidably and upwardly communicating into said tank, said piston valve having a plate slidably disposed thereon, said plate having resilient elements engaged between said plate and said valve to urge said plate normally downward and to engage said valve when pressed upwardly against said downward urge to open said normally closed valve, whereby, when a cup is pressed upward along with said plate against the urge of said resilient elements, said plate engages said valve to open said valve thereby to discharge fluid from said tank into said cup, and when released said cup is held in said third compartment by the downward urge of the resilient elements upon said plate.

7. In a fluid dispensing means for mounting in vehicles: an insulated tank and a normally closed plug valve disposed in and extending from the bottom of said tank; said valve including a plunger entering said tank, a retaining ring about said plunger; a first spring disposed between the bottom of said tank and the top of said retaining ring and adapted to normally urge said plunger downward to the normally closed position thereof in said tank, said plunger including therein apertures through which to discharge fluid from said tank in the open position thereof, said first spring engaging said retaining ring and having a first degree of resilience, a plate means disposed about the bottom end of said plunger and slidable thereon, said plate having a collar thereon engageable with the bottom surface of said retaining ring; a second spring adapted to urge said plate means normally downward and being engaged between said plate and the bottom surface of said tank, said second spring having a second degree of resilience sufficiently less than said first degree of resilience of said first spring so as to be urged first upon upward pressure on said plate with a cup to move upwardly against and to engage said retaining ring and thereby press said plunger upwardly against the urge of said first spring thereby to urge said valve into said open position thereof and permit discharge of fluid into said cup, and, when said cup is filled, said plate being urged downwardly against said cup to prevent spillage and splash from said cup.

8. In a fluid dispensing means as defined in claim 7 an automatic fluid shut-off means disposed in said plate means and including means to close off air exhaust when said cup has been filled so as to cut off further discharge of fluid from said tank into said cup through said plug valve by the back pressure built up when said air exhaust is closed off.

References Cited

UNITED STATES PATENTS

| 2,081,159 | 5/1937 | Tamminga et al. | 141—303 X |
| 2,828,781 | 4/1958 | Hammack | 141—82 |
| 3,061,152 | 10/1962 | Safianoff et al. | 141—360 X |
| 3,326,417 | 6/1967 | Tinsley | 141—362 X |

FOREIGN PATENTS

| 637,323 | 1/1928 | France. |
| 83,710 | 5/1954 | Norway. |

HOUSTON S. BELL, JR., *Primary Examiner.*